W. H. GAINES.
SHOCK ABSORBER.
APPLICATION FILED DEC. 6, 1920.
1,419,838.
Patented June 13, 1922.
2 SHEETS—SHEET 1.
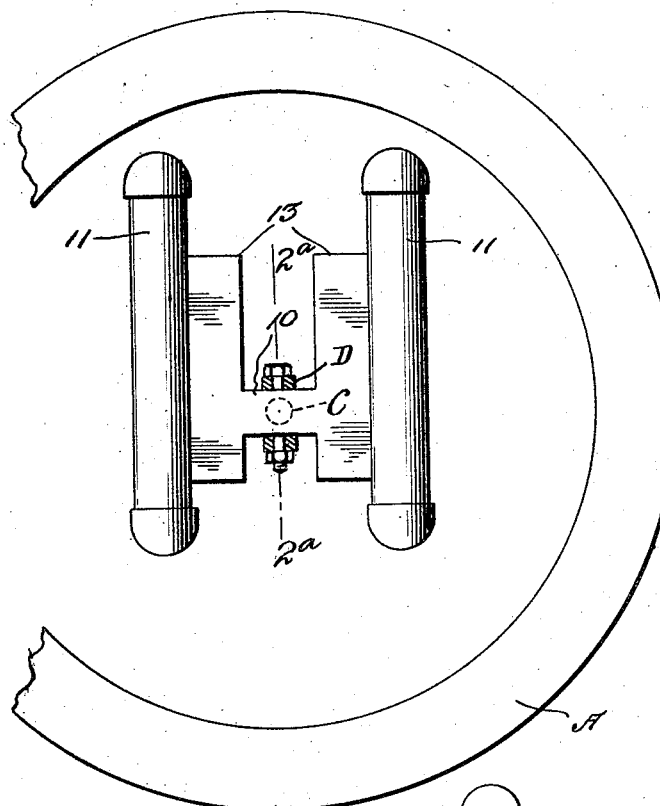
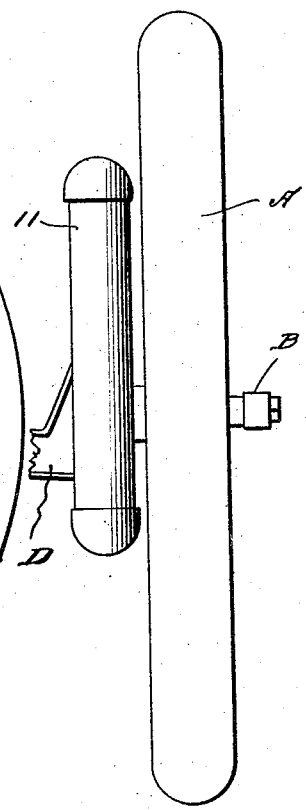
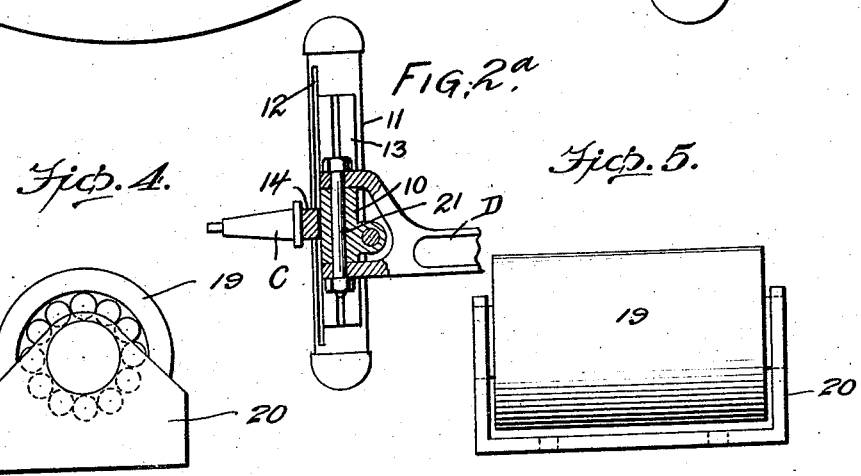
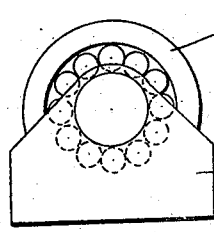
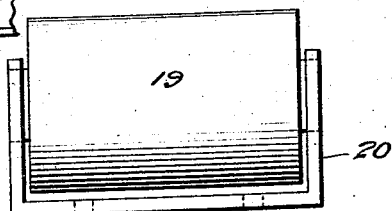
W. H. Gaines, INVENTOR
BY Victor J. Evans
ATTORNEY W. H. GAINES.
SHOCK ABSORBER.
APPLICATION FILED DEC. 6, 1920.
1,419,838.
Patented June 13, 1922.
2 SHEETS—SHEET 2.
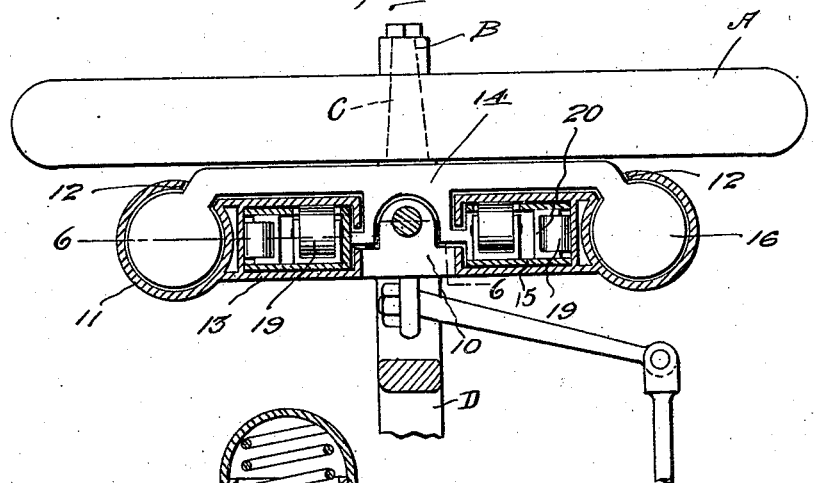
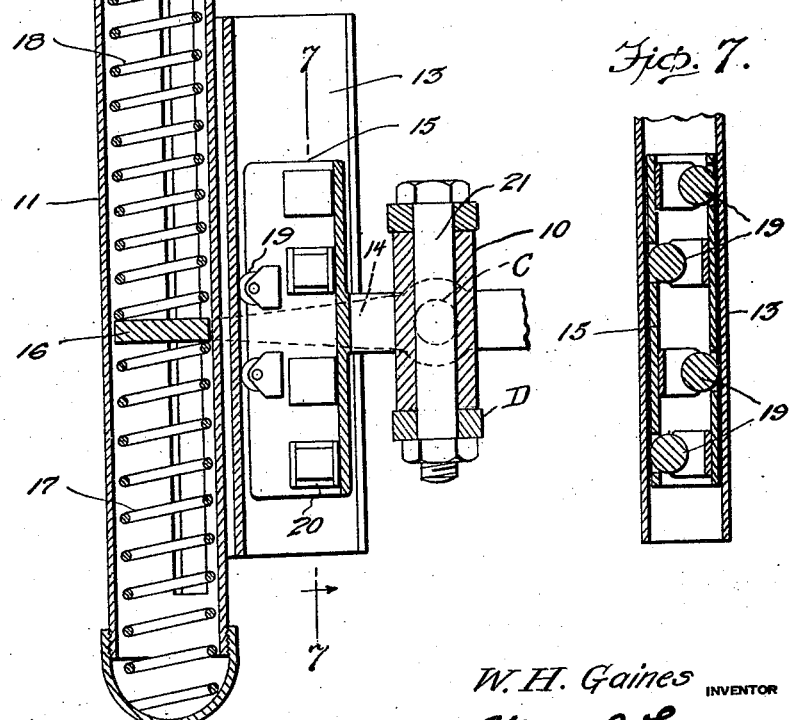
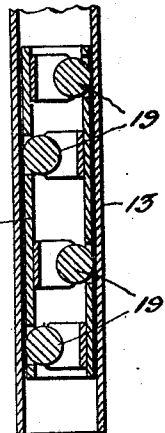
W. H. Gaines INVENTOR
BY Victor J. Evans ATTORNEY

UNITED STATES PATENT OFFICE.

WILLIAM H. GAINES, OF ESTILL SPRINGS, TENNESSEE.

SHOCK ABSORBER.

1,419,838.　　　　　Specification of Letters Patent.　Patented June 13, 1922.

Application filed December 6, 1920. Serial No. 428,709.

*To all whom it may concern:*

Be it known that I, WILLIAM H. GAINES, a citizen of the United States, residing at Estill Springs, in the county of Franklin and State of Tennessee, have invented new and useful Improvements in Shock Absorbers, of which the following is a specification.

This invention relates to attachments designed primarily for use on motor vehicles and has for its object the provision of a novel shock absorbing mechanism for use upon the front wheels, the construction being such that the wheels are spring supported with respect to the front axle so that the wheels may have up and down movement relatively to the axle when the vehicle is traveling so that the shocks and jars will not be transmitted to the chassis.

An important object is the provision of a shock absorber of this character in which spring means is provided not only for taking up the initial shocks but also for absorbing the rebound shocks.

Another object is the provision of a device of this character in which the movable parts are so constructed and related as to reduce friction to the minimum, the parts being also so constructed that adjustment may be made to take up wear to prevent rattling.

An additional object is the provision of a device of this character which will be simple and inexpensive in construction, highly efficient in use, durable in service, and a general improvement in the art.

With the above and other objects and advantages in view, the invention consists in the details of construction to be hereinafter more fully described and claimed and illustrated in the accompanying drawings in which Figure 1 shows a side elevation of my device illustrating one form thereof, Figure 2 is an elevation at right angles to Figure 1, Figure 2ª is a section on line 2ª—2ª of Fig. 1, Figure 3 is a plan view with parts in section, Figure 4 is an enlarged detail view of one of the roller bearing members, Figure 5 is another detail view of the latter, Figure 6 is a vertical sectional view, Figure 7 is a section on the line 7—7 of Fig. 6.

Referring more particularly to the drawings, the letter A designates a front wheel of a motor vehicle having the usual hub B mounted upon the spindle C which in ordinary practice is pivoted for swinging movement to accomplish steering.

In carrying out my invention I provide a spindle body 10 pivotally mounted upon a front axle D. This spindle body has secured at opposite sides thereof spaced vertical cylindrical housings 11 which have their confronting faces formed with slots 12. This spindle body is formed at opposite sides with guides 13 which are inwardly of the housings 11. Associated with this spindle body 10 is a relatively movable body 14 from which projects the spindle C and this body 14 carries slides 15 which are movable within the guides 13 and is formed with laterally projecting arms 16 extending through the slots 12 into the housings 11. Located within the lower portions of the housings and engaging against the undersides of the arms 16 are springs 17 while located within the upper portions of the housings and engaging the upper sides of the arms 16, are similar springs 18. One pair of springs is for taking up the initial or ordinary shock while the other pair is for absorbing the rebound. Associated with the slides 15 are roller bearing devices 19 which include suitable brackets 20.

In the operation of the device it will be seen that when the vehicle is traveling and in fact at all times the weight is suspended by the upper springs 18. When an obstruction is engaged as in running over rough ground, the wheels and the body 14 from which they are carried may move up and down with respect to the axle and spindle body 10, the springs 17 opposing movement in one direction and spring 18 opposing the cushioning movement in the other direction so that all the shocks are taken up by the springs and prevented entirely from being transmitted to the chassis itself. The roller bearing devices 19 reduce friction to the minimum and insure smooth and easy operation. In the event of wear, it is of course apparent that suitable wear strips or plates may be interposed between the roller bearings and the surfaces against which they travel. In this way all looseness may be taken up so that rattling and play in the steering mechanism will be prevented. It should be stated that the spindle body 10 is provided with a suitable hole 21 for the passage of the usual spindle bolt and that the body 10 is also provided with a suitable arm if preferred, for connection of the steering rod. With the device properly constructed and well proportioned, it is apparent that it need not increase the width of the gage nor take up much more room than the ordinary construction.

From the foregoing description and a study of the drawings it will be apparent that I have thus provided a simply constructed and easily installed shock absorber for the front wheels of motor vehicles which will very efficiently operate under any and all conditions and which will confine shocks and jars locally to the wheels and prevent their transmission to any other part of the vehicle.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A shock absorbing mechanism for the front wheels of motor vehicles, comprising the combination with the front axle, of a spindle body pivotally connected with each end of the axle, a slide member carried by said spindle body, guide means slidable accommodating said slide and provided with spaced slotted housings, said slides being formed with extensions passing through said slots and movable within said housings, and a pair of springs within each housing engaging against the top and bottom of the extension therein.

2. A shock absorbing device for the front wheels of motor vehicles, comprising the combination with the front axle and front wheels, of a spindle body pivotally connected with each end of the front axle, a vertical guide member carried by the spindle body, a pair of spaced upright housings carried by the guide and formed with vertical slots, a slide member vertically slidably mounted within said guide and provided with a spindle upon which the front wheel is journaled, extensions on said slide passing through the slots and entering said housing, and a pair of springs within each housing engaging above and below the extensions therein.

3. A shock absorbing mechanism for the front wheels of motor vehicles, comprising the combination with the front axle and front wheels, of a spindle body pivoted upon each end of the front axle, a vertically extending guide member carried by said spindle body and formed at its opposite side edges with vertical housings provided with slots, a member slidable within said guide and having rollers engaging interiorly of the latter, a spindle extending from said slide member and upon which the front wheel is journaled, extensions formed on said slide member passing through said slots into said housings, and cushion means within said housing opposing movement of said extensions in either direction.

In testimony whereof I affix my signature.

WILLIAM H. GAINES.